DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1570

T915,015

AQUEOUS DISPERSIONS OF ETHYLENE CO-POLYMERS AND PROCESSES FOR THEIR PREPARATION

Thomas Charles Bissot, Deer Run Road, R.D. 3, Newark, Del. 19711, and Vernon Clare Wolff, Jr., 1400 Ivy Drive, Webster Farms, Wilmington, Del. 19803

Continuation-in-part of application Ser. No. 164,477, July 20, 1971, which is a continuation-in-part of application Ser. No. 805,381, Mar. 7, 1969, both now abandoned. This application Mar. 22, 1973, Ser. No. 343,685

Int. Cl. C08f *27/00, 45/44, 47/20*

U.S. Cl. 260—29.6 TA

No Drawing. 15 Pages Specification

Stable, aqueous dispersions of copolymers of 65 to 97 percent ethylene and 35 to 3 percent of an alpha,beta-ethylenically unsaturated carboxylic acid, such as methacrylic acid, are provided which have solids contents greater than 50 percent and in which less than 10 percent of the acid groups in the copolymer are neutralized with metal ions such as $Na^+$ or $K^+$. These dispersions retain the adhesion properties and chemical reactivity of free acid groups. The dispersions are prepared by dissolving the copolymer in a water-immiscible solvent mixture of a hydrocarbon solvent and a polar liquid, dispersing the solution in water which contains ammonia or a volatile organic amine and an alkali metal hydroxide in an amount to neutralize less than 10 percent of the acid groups in the copolymer, and evaporating the solvents from the resulting dispersion.